United States Patent [19]

Palmer et al.

[11] Patent Number: 5,579,942
[45] Date of Patent: Dec. 3, 1996

[54] VACUUM SUPPORT AND RUPTURE DISK ASSEMBLY

[75] Inventors: Steven S. Palmer, Tulsa; Stephen P. Farwell, Owasso; Tom Chau, Tulsa, all of Okla.

[73] Assignee: BS&B Safety Systems, Inc., Tulsa, Okla.

[21] Appl. No.: 530,016

[22] Filed: Sep. 19, 1995

Related U.S. Application Data

[63] Continuation of Ser. No. 133,634, Oct. 7, 1993, abandoned.

[51] Int. Cl.$^6$ ............................................ F16K 17/40
[52] U.S. Cl. ........................................ 220/89.2; 220/89.1
[58] Field of Search ........................ 220/89.2, 89.1, 220/203, 207, 281

[56] References Cited

U.S. PATENT DOCUMENTS

| | | | |
|---|---|---|---|
| 2,952,383 | 9/1960 | Paxton et al. | 220/89 |
| 3,443,721 | 5/1969 | LeJeune | 220/89.2 |
| 4,102,469 | 7/1978 | Shegrud et al. | 220/89 A |
| 4,139,005 | 2/1979 | Dickey | 220/89.4 |
| 4,315,575 | 2/1982 | Schwarz et al. | 220/89.2 |
| 4,819,823 | 4/1989 | Kadakia et al. | 220/89 A |
| 5,121,847 | 6/1992 | Ellis | 220/89.2 |

FOREIGN PATENT DOCUMENTS 1138885  1/1969  United Kingdom.

*Primary Examiner*—Joseph M. Moy
*Attorney, Agent, or Firm*—Dougherty, Hessin, Beavers & Gilbert

[57] ABSTRACT

Vacuum support and rupture disk assembly in which the vacuum support member does not restrict flow through the rupture disk includes a rupture disk having opposite faces defining a plane and a blow-out portion of selected planar dimension; a vacuum support member positionable adjacent a face of the rupture disk and being smaller in planar dimension than the blow-out portion; and a retainer for holding the vacuum support member adjacent the face of the rupture disk and restraining motion of the vacuum support member in all directions except through the rupture disk in such a manner than the entire vacuum support will pass through the blow-out portion if the rupture disk ruptures.

22 Claims, 3 Drawing Sheets

VACUUM SUPPORT AND RUPTURE DISK ASSEMBLY

This application is a continuation of application Ser. No. 08/133,634 filed on Oct. 7, 1993, abandoned.

BACKGROUND OF THE INVENTION

This invention relates to rupture disk assemblies and, more particularly, but not by way of limitation, to rupture disk assemblies which operate at low pressures and use a vacuum support to prevent reverse rupture of the rupture disk.

A large variety of safety pressure relieving devices of the rupture disk type have been developed and used. Generally, these devices include a rupture disk supported between complementary supporting members or flanges which are connected to a relief connection in a vessel or system containing fluid pressure. When the fluid pressure within the vessel or system exceeds the design rupture pressure of the disk, the disk ruptures causing fluid pressure to be relieved from the vessel or system through the ruptured disk.

One material of which rupture disks are commonly made is carbon, or more precisely carbon graphite. Carbon rupture disks which have been impregnated with resins to make them gas-tight have been found to be advantageous in that they are economical to produce, have excellent chemical corrosion resistance, do not creep and fatigue as a result of pressure variations, and reliably rupture at their predetermined rupture pressure regardless of temperature variations.

Carbon rupture disks have been used in low pressure applications. If the carbon rupture disks are rated for burst pressures of approximately 22 psig or less, it is common practice to use a vacuum support to prevent reverse rupture of the disk. That is, for example, if the pressure on the inlet side of the rupture disk (within the equipment which the rupture disk is protecting against overpressure) drops to 0 psig, the atmospheric pressure (assuming the relief system is vented to atmosphere) exerted on the downstream or outlet side of the rupture disk will be approximately 15 psig and can cause reverse flexure and cracking or rupture of the disk, since carbon graphite is a brittle material. Therefore, the vacuum support is used to bolster the inlet side and prevent reverse flexure and rupture under vacuum or reverse pressure conditions.

U.S. Pat. No. 4,102,469 to Shegrud discloses a prior vacuum support. Referring to FIG. 3, Shegrud discloses a vacuum support 42 which fits into lined bores 44, 45 and has a plurality of passageways or channels 52 therethrough for communication of pressure between the pressure relief passageway 53 and the frangible diaphragm 43. A circumferential shoulder 54 on the vacuum support 42 rests upon the liner 47 at the step 46 and prevents the bottom 54 of the vacuum support from exerting unwanted pressure on the frangible diaphragm 43. A problem with the Shegrud vacuum support is that the vacuum support restricts the flow through the rupture disk when the rupture disk ruptures due to overpressure from the protected vessel. The circumferential shoulder 54 prevents the vacuum support from passing through the rupture disk and therefore the flow through the rupture disk and vacuum support is limited to the flow capacity of the channels 52 through the rupture disk.

U.S. Pat. No. 4,315,575 to Schwarz discloses another vacuum support for a burst protection device. Schwarz' vacuum support is formed of a multiplicity of graphite rings. The rings have a prismatic cross section with the prism surfaces inclined relative to the plane of the disk. Schwarz discloses that, if the protected vessel is operated at a reduced pressure, the individual rings are braced against each other and in the case of an overpressure, the rings are pushed out with the rupture disk. The Schwarz device is a relatively complex vacuum support in which molded graphite bodies are sawed, turned, or ground to create the rings. In such a device, precision tolerances are critical, as any relative slippage of the prismatic surfaces of the rings away from the rupture disk during an underpressure (or overpressure on the outlet face) will allow the pressure plate 3 and the brittle rupture disk to flex toward the inlet and crack or rupture. It is contemplated that this relative slippage of the prismatic rings towards the rupture disk during an overpressure creates the need for the pressure plate 3 to equalize pressure loading between the vacuum support and the rupture disk and to thereby prevent premature rupture of the rupture disk when the rings are subjected to positive pressure loading from the protected vessel. The inclined prism surfaces of the rings also create a problem in that either the larger end of the prismatic rings must be larger than the rupture zone of the rupture disk, as illustrated in the figure, in which case the outermost ring(s) appear to be too large to pass through the rupture zone and to restrict flow through the rupture disk; or, if the larger end of the prismatic rings were to be made the same size as the rupture zone, the smaller end of the inclined holding ring 6 would have to be smaller than the rupture zone and therefore restrict the flow passageway in order for the inclined surfaces of the ring 6 to brace the prism-shaped rings during a vacuum. Schwarz discloses that the prismatic rings may consist of at least two parts, but does not disclose or suggest how or why such parts would be made, interact, affect operation of the rings, etc.

Therefore, there is a need for a vacuum support which does not restrict flow through the rupture disk, i.e., that allows full flow through the ruptured disk without creating a flow restriction. There is a need for such a vacuum support which is simple and inexpensive to manufacture and in which precise machining tolerances of fitted or interlocking parts are not required. There is a need for such a vacuum support which eliminates the use of pressure plates to equalize pressure loading between the vacuum support and the rupture disk.

SUMMARY OF THE INVENTION

The present invention is contemplated to overcome the foregoing deficiencies and meet the above-described needs. In accomplishing this, the present invention provides a novel and improved vacuum support and rupture disk assembly.

The invention includes a rupture disk having opposite faces defining a plane and including a blow-out portion of selected planar dimension; a vacuum support member positionable adjacent the face of the rupture disk which is smaller in planar dimension than the blow-out portion; and retaining means for holding the vacuum support member adjacent the face of the rupture disk. The retaining means restrains motion of the vacuum support member in all directions except through the blow-out portion of the rupture disk. The retaining means may include a retainer, extending between an inlet ring and the vacuum support member for holding the vacuum support member adjacent the blow-out portion of the rupture disk and within the inlet ring. The inlet ring has an inlet bore and the vacuum support member is smaller in planar dimension than the inlet bore and is retained within the inlet bore by the retaining means.

It is an advantage of the present invention to provide a vacuum support for a rupture disk assembly which does not restrict flow through the rupture disk.

It is an advantage of the present invention to provide a vacuum support and rupture disk assembly which is simple and inexpensive to manufacture and in which precise machining tolerances are not required.

BRIEF DESCRIPTION OF THE DRAWINGS

The present invention will be better understood by reference to the example of the following drawings.

DETAILED DESCRIPTION OF THE PREFERRED EMBODIMENTS

Figure 1:
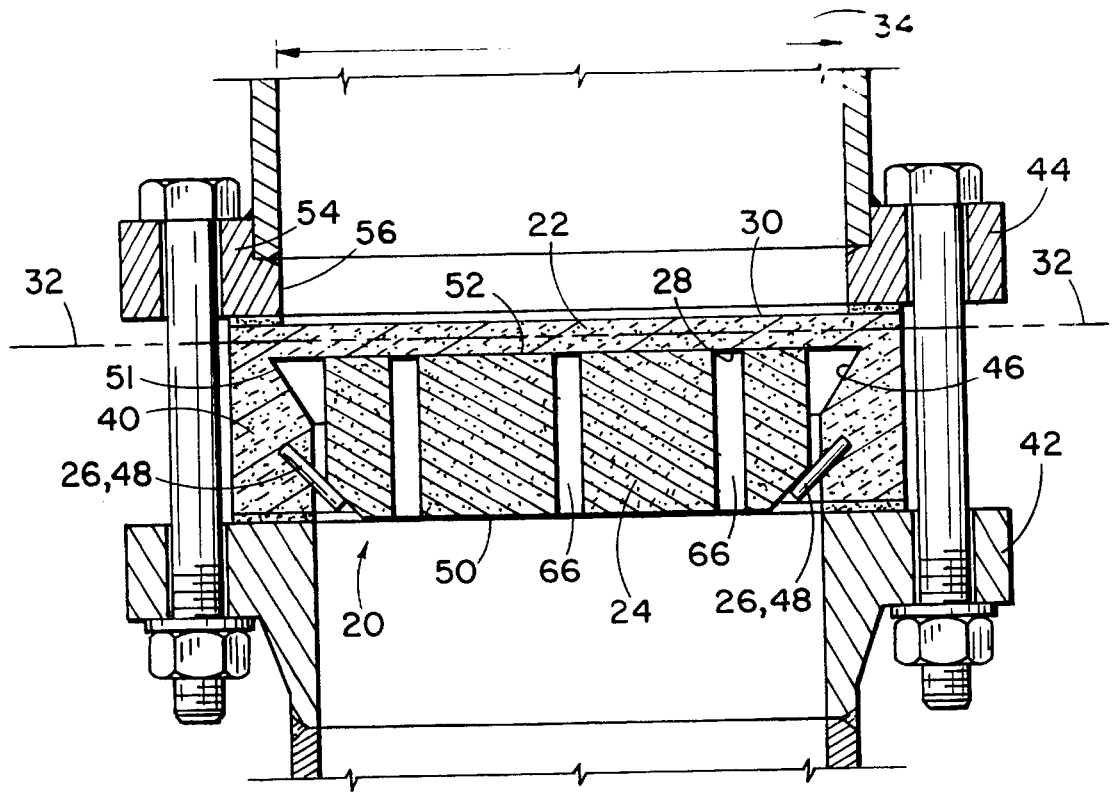
FIG. 1 is a side cross-sectional view of an embodiment of the vacuum support and rupture disk assembly of the present invention.
Figure 2:
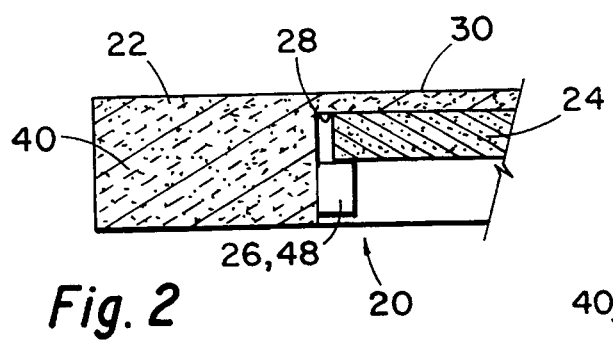
FIG. 2 is a fragmentary cross-sectional view of another embodiment of the present invention.

Preferred embodiments of the invention will now be described with reference to the drawings. Like reference characters refer to like or corresponding parts throughout the drawings and description.

FIGS. 1–11 present embodiments of the vacuum support and rupture disk assembly, generally designated 20, of the present invention. Although a preferred embodiment of the assembly 20, described herein to facilitate an enabling understanding of the description, is made of carbon graphite, it is intended to be understood that the vacuum support and/or rupture disk of the assembly may be made of many materials, such as RYTON®, thermoset plastics, polymers, and other rupturable materials. (RYTON® is a trademark of Phillips Petroleum Company used to identify a commercially available poly(phenylene sulfide).) Also, although the assembly 20 is described for use as a vacuum support for a rupture disk, it is intended to be understood that it will serve equally as well as a backpressure support in situations where backpressures on the outlet side of the rupture disk which approach the rupture pressure of the disk are possible.

Referring to the example of FIG. 1, the assembly 20 may be generally described as including a rupture disk 22, vacuum support member 24, and retaining means 26. The rupture disk 22 has opposite faces 28, 30 which generally lie in or define a plane 32 which is used as the reference plane 32 herein. The plane 32 is preferably about perpendicular to the direction of pressure-relieving flow through the assembly 20. The rupture disk also includes a blow-out portion 34 of selected planar dimension and area. By planar dimension or area is meant the dimension or area occupied by the blow-out portion on a face 28, 30 of the rupture disk 22. The blow-out portion 34 breaks away or separates from the rupture disk assembly 20 when the rupture disk 22 is ruptured and is normally discharged or carried away by the discharging pressurized fluid.

The vacuum support member 24 is positionable adjacent a face 28, 30 of the rupture disk 22 (the face of the rupture disk which requires vacuum support) and is smaller in planar dimension than the blow-out portion 34 so that the entire vacuum support member 24 will pass freely through the blow-out portion 34 without binding or getting caught when the rupture disk 22 ruptures due to an overpressure. The retaining means 26 is used for holding the vacuum support member 24 adjacent the face of the rupture disk 22. The retaining means 26 restrains motion of the vacuum support member 24 in all directions except through the blow-out portion 34 of the rupture disk 22. The retaining means should hold the vacuum support member 24 positively and securely against the rupture disk 22. Preferably, the retaining means 26 non-adhesively holds the vacuum support member 24 adjacent the rupture disk 22 to ensure that the vacuum support member does not adhere to the retaining means 26 and will pass freely through the rupture disk 22 upon rupture.

Referring to the example of FIG. 1, the rupture disk 22 may be described as having an inlet face 28 which is normally exposed to the piping, vessel, or equipment which is to be protected from overpressure by the rupture disk, and an outlet face 30 which is normally directed towards and exposed to the discharge piping and equipment which may be a source of backpressure. The vacuum support member 24 is normally positioned adjacent the inlet face 28 of the rupture disk 22 in order to support the rupture disk 22, and particularly the blow-out portion 34 of the rupture disk 22, when the inlet face 28 of the rupture disk is exposed to a vacuum, underpressure, or when the outlet face 30 of the disk 22 is exposed to a backpressure.

In the preferred embodiment, the assembly 20 includes an inlet ring 40 disposed adjacent the inlet face 28 of the rupture disk 22 and surrounding the vacuum support member 24. The inlet ring 40 is used in conjunction with the retaining means 26 to retain the vacuum support member 24 against the inlet face 28 of the rupture disk 22; or, stated another way, the retaining means 26 holds the vacuum support member 24 in the inlet bore 46 against the blow-out portion 34 of the rupture disk 22. The inlet ring 40 may be a frame, rim, or holder for the rupture disk 22 which is held between inlet and outlet flanges 42, 44, or may be provided by appropriate connections to the inside wall of the inlet flange 42, i.e., the retaining means 26 may be connected between the inside wall of the inlet flange 42 and the vacuum support member 24 to hold the vacuum support member 24 in proper position.

The rupture disk 22 may be a flat disk on which the blow-out portion 34 is defined by the inlet and outlet supports for the disk 22, as further discussed below. In the preferred embodiment, the inlet ring 40 is an integral portion of the rupture disk 22 formed by and around the inlet bore 46, such as by machining or molding. The vacuum support member 24 is smaller in all planar dimensions and area than the inlet bore 46 and is disposed within the inlet bore. The vacuum support member should be sufficiently smaller than the inlet bore 46 and blow-out portion 34 that the vacuum support member 24 passes freely through the inlet bore 46 and blow-out portion 34 when the disk 22 ruptures. In the prototype assembly 20, there is at least 1/16 inch clearance per side and 1/8 inch clearance overall between the edge of the vacuum support member 24 and the inlet bore 46 and blow-out portion 34.

Figure 3:
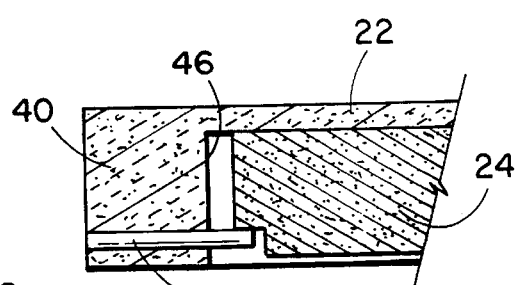
FIG. 3 is a fragmentary cross-sectional view of another embodiment of the present invention.
Figure 4:
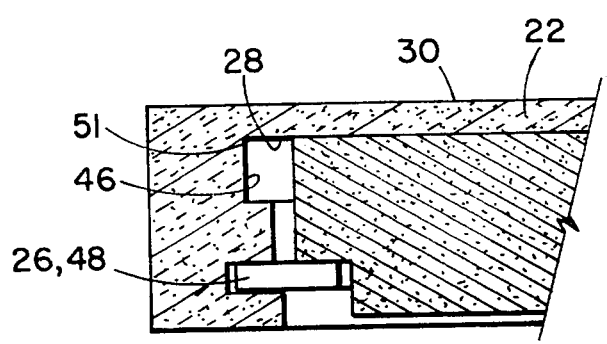
FIG. 4 is a fragmentary cross-sectional view of another embodiment of the present invention.
Figure 5:
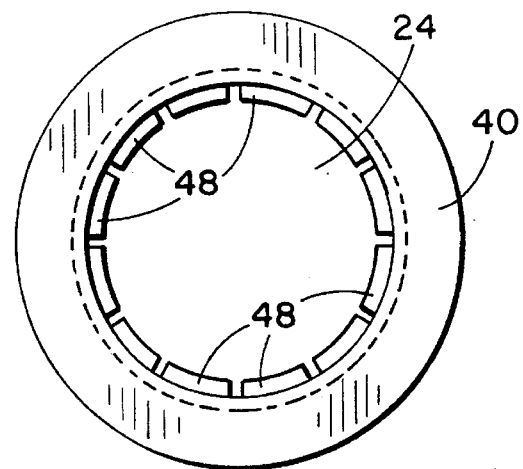
FIG. 5 is a bottom view of the inlet side of another embodiment of the present invention.
Figure 6:
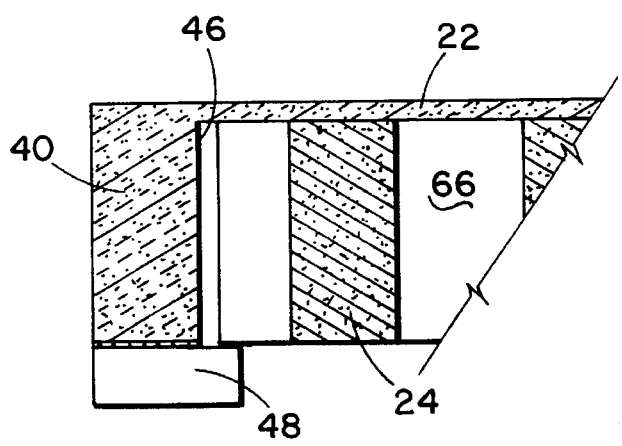
FIG. 6 is a fragmentary cross-sectional view of another embodiment of the present invention.
Figure 7:
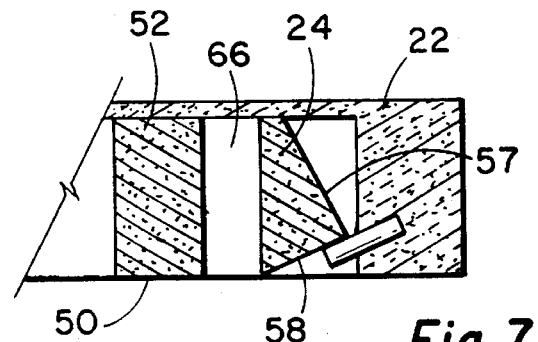
FIG. 7 is a fragmentary cross-sectional view of another embodiment of the present invention.

The retaining means 26 includes a retainer 48 which extends between the inlet ring 40 and the vacuum support member 24 for holding the vacuum support member 24 adjacent the blow-out portion 34 of the rupture disk 22 and within the inlet ring 40. The retainer 48 holds the vacuum support member 24 in the inlet bore 46. In the preferred embodiment, the vacuum support member 24 is otherwise unrestricted against axial motion out of the inlet bore 46 and through the blow-out portion 34 of the ruptured disk 22. The retainer 48 may take the form of lock pins 48 (best seen in FIG. 1) or tabs 48 (FIG. 2) which extend from the inlet ring 40 inwardly beyond the peripheral edge of the vacuum support member 24. The pins 48 may be round, square, hex-shaped, etc. and may extend from inside the inlet ring 40 (FIG. 1) if it is desirable to avoid creating a leak path through the inlet ring or may extend from the outside completely through the inlet ring 40 (as illustrated in FIG. 3). The retainer 48 may also take the form of a snap-type ring (such as a C-ring) and groove 49, best exemplified in FIG. 4, a multi-sectioned ring, as best seen in FIG. 5, or may be a shoulder ring 48 attached to and extending inwardly from the free end of the inlet ring 40, as best seen in FIG. 6. The number of pins, tabs, the peripheral extent of the snap ring, and other design details of the retaining means 26 will vary with the size of the assembly 20 and would be known to one skilled in the art in view of the disclosure contained herein. For example, the pins, tabs, snap ring, and shoulder ring may be fitted into slots or grooves in the inlet ring 40; may be adhesively fastened to the inlet ring 40; may be internally formed with the inlet ring 40 if the inlet ring 40 is not integral with the rupture disk 22, and so on.

The retaining means 26 and vacuum support member 24 should be designed so that the vacuum support member 24 is held against the inlet face 28 of the rupture disk 22 and thereby substantially prevents flexure or motion of the rupture disk 22 toward the inlet ring 40. As previously mentioned, particularly carbon rupture disks 22 are brittle and reverse flexure toward the inlet ring 40 will result in rupture or cracking of the disk 22.

The vacuum support member 24 should be sufficiently smaller than the blow-out portion 34 and/or inlet bore 46 that the vacuum support member will pass freely through the blow-out portion 34 without binding or restriction when the disk 22 ruptures. This may be accomplished in several ways. For example, referring to FIG. 7, the vacuum support member 24 may have peripheral edges 57, 58 which are angled inwardly towards its inlet face 50 and outlet face 52 to reduce binding. Referring to FIGS. 2, 3, 6, and 8, the vacuum support member 24 may be made of sufficiently smaller size in all planar dimensions than the inlet bore 46 and blow-out portion 34 that the vacuum support member 24 will not be retarded in passage through the blow-out portion 34. Conversely, the inlet bore 46 and/or blow-out portion 34 may be enlarged with respect to the vacuum support member 24 as illustrated in FIGS. 1 and 4. The blow-out portion 34 adjacent the inlet bore 46 should be sufficiently larger than the vacuum support member 24 that the vacuum support member 24 cannot become cocked and lodged within the inlet bore 46 or upon any burr or ragged edge around the blow-out portion 34 created by the rupture. Preferably, the inlet ring 40 is in contact with the inlet face 28 of the rupture disk and the point of contact between the peripheral edge 51 of the inlet ring 40 and the rupture disk inlet face 28 will largely determine the planar shape, area, and dimension of the blow-out portion 34 on the rupture disk inlet face 28. A scoreline or groove (not illustrated) may be used on either or both faces 28, 30 of the rupture disk 22 to reduce the occurrence of burrs or ragged edges and to more precisely define the edges, area, and shape of the blow-out portion 34.

Figure 8:
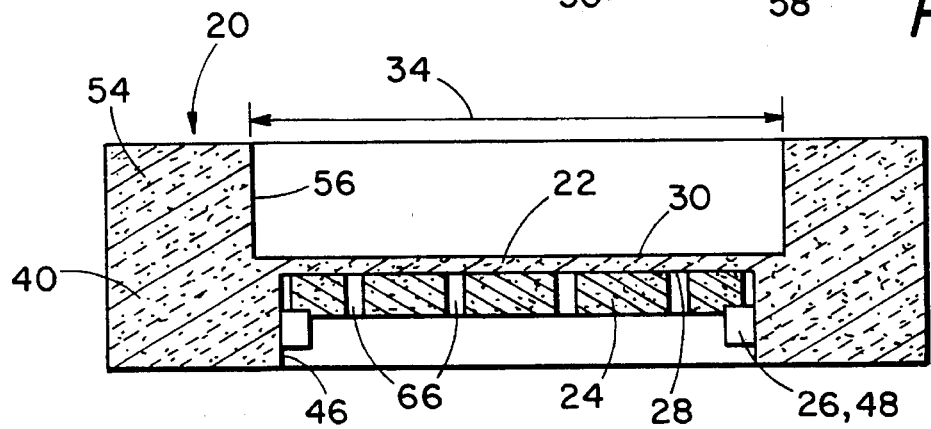
FIG. 8 is a cross-sectional view of another embodiment of the present invention.
Figure 9:
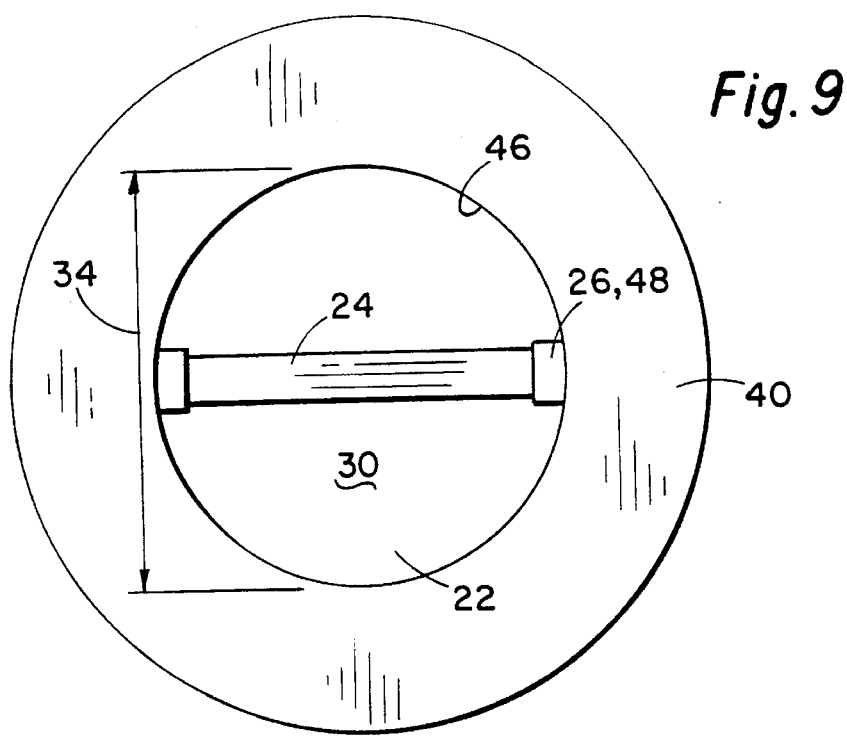
FIG. 9 is a bottom view of the inlet side of another embodiment of the present invention.

As illustrated in FIG. 8, typically the rupture disk assembly will include an outlet ring 54 disposed adjacent the outlet face 30 of the rupture disk which defines an outlet bore 56. Normally the outlet bore 56 will define the planar area, shape, and dimensions of the blow-out portion 34 on the outlet face 30 of the rupture disk. Often, the inlet bore 46 is smaller in planar area and dimension than the outlet bore and defines the planar area and dimension of the blow-out portion 34 on the inlet face of the rupture disk. The vacuum support member 24 should be sufficiently smaller in all planar dimensions than the inlet bore 46 and the blow-out portion 34 to allow free passage of the vacuum support member 24 through the blow-out portion 34. Passage of the vacuum support member 24 through the blow-out portion may be assisted by enlarging the inlet bore 46 adjacent the blow-out portion 34, as exemplified in FIGS. 1 and 4. In cases where the outlet bore 56 is substantially equal in planar area and dimension to the inlet bore, the vacuum support member 24 should be sufficiently smaller than both bores 46, 56 to pass freely through the bores 46, 56 when the disk ruptures. As with the inlet ring 40, the outlet ring 54 may be the support member for the rupture disk 22, such as the outlet flange housing 44, a rupture disk holder, or a modularized rupture disk head. Preferably, the inlet ring 40 and the outlet ring 54 will be integral portions of the rupture disk 22 surrounding the inlet and outlet bores 46, 56.

Referring to the examples of FIGS. 1, 5, 9, and 10, normally the blow-out portion 34, inlet bore 46, and outlet bore 56 will be circular in the planar dimension, although other shapes may be used. The preferred inlet and outlet bores 46, 56 are generally cylindrical in shape, with the cylindrical shapes having an axis about perpendicular to the plane 32 of the rupture disk 22, as is common in carbon disks in which the inlet and outlet faces 28, 30 are bored to provide a blow-out portion 34 of selected thickness and burst strength. The preferred vacuum support member 24 is also circular in planar dimension, although it may take other shapes. For example, referring to the example of FIG. 9, the vacuum support member may be bar-shaped when the bar shape will provide adequate vacuum support (normally when the burst pressure of the disk 22 is 10 psig or greater). As with the circular vacuum support member 24, the bar-shaped vacuum support member 24 and its retaining means 26 must be sized so that the bar 24 will not lodge in the rupture disk 22 during rupture. L-shaped or other shaped tabs may be used as the retainers 26 to support the bar-shaped vacuum support member 24. The tabs should be slotted or otherwise keyed to the bar-shaped support member 24 so that the support member 24 will not rotate off the tabs 26. As with the other forms of retainers 26, the tabs may be epoxied to the inlet ring 40, fitted to slots, holes, or other connections in the inlet ring, or integrally formed with an inlet ring which is not integral with the rupture disk 22.

Figure 10:
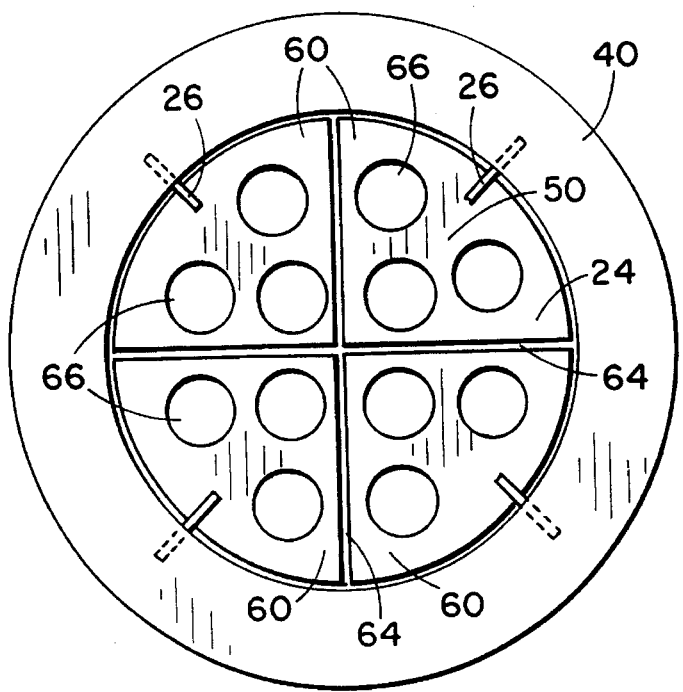
FIG. 10 is a bottom view of the inlet side of another embodiment of the present invention.
Figure 11:
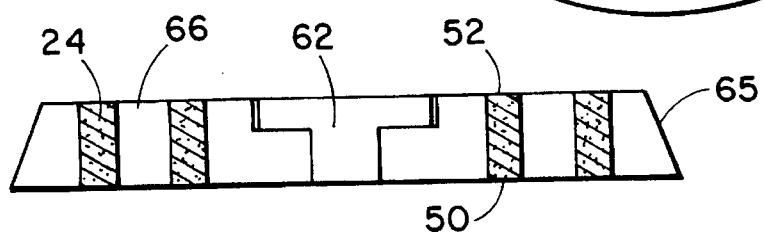
FIG. 11 is a cross-sectional view of another embodiment of a rupture disk which may be used with the present invention.

The vacuum support member 24 may also comprise a plurality of segments 60, such as the wedge-shaped segments 60 exemplified in FIG. 10. The segmented vacuum support member 24 is useful in applications where it is desirable to ensure that the vacuum support member 24 fragments into a number of small pieces. Preferably, the segments 60 are not annular in shape in order to reduce the likelihood of their becoming lodged in the rupture disk assembly or downstream equipment. FIG. 11 is a cross-sectional view of a vacuum support member 24 similar to the one shown in FIG. 10 in which a shouldered centerpiece 62 is added to the segments 60 to further reduce the size of the segments 60. The shouldered centerpiece 62 may be fitted or shaped as an interlocking support member with the wedge-shaped segments 60; or may be used without segments 60. The vacuum support member 24 may be made of a frangible material and may be provided with scorelines or grooves 64 (FIG. 10) to facilitate breakage of the vacuum support member 24 into pieces of selected shape and size upon rupture of the rupture disk 22. FIG. 11 also illustrates the use of a peripheral edge 65 which is angled inwardly toward the outlet face 52 in order to reduce the likelihood of the vacuum support member 24 binding or lodging in the rupture disk 22 during rupture.

When the vacuum support member 24 is of circular shape or other shapes which substantially fill the inlet bore 46, the member 24 should be molded, perforated, or bored to have channels 66, or their equivalent, extending from the inlet face 50 through the outlet face 52 so that the rupture disk 22 is fully exposed to the pressure upstream of the vacuum support member 24 and the vacuum support member 24 does not interfere with proper operation of the rupture disk 22.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. Vacuum support and rupture disk assembly, comprising:

a rupture disk having an inlet face and an outlet face defining a plane, the inlet face having an inlet bore of selected planar dimension, the inlet bore defining a blow-out portion of selected planar dimension;

a vacuum support member positionable adjacent a face of the rupture disk between the rupture disk and an inlet pressure source, the vacuum support member being smaller in all planar dimensions than the inlet bore, the vacuum support member being smaller in planar area than the inlet face of the rupture disk so that the inlet face of the rupture disk is exposed to the full pressure of the inlet pressure source; and retaining means for holding the vacuum support member in the inlet bore adjacent the inlet face of the rupture disk.

2. Assembly of claim 1 in which the retaining means comprises:

an inlet ring adjacent the rupture disk and surrounding the vacuum support member; and a retainer, extending between the inlet ring and the vacuum support member, for holding the vacuum support member adjacent the blow-out portion of the rupture disk and within the inlet ring.

3. Assembly of claim 2:

wherein the inlet ring is defined as being integral with the rupture disk.

4. Assembly of claim 2, comprising:

an outlet ring adjacent the opposite face of the rupture disk from the inlet ring, the outlet ring defining the planar dimension of the blow-out portion on the face of the rupture disk adjacent the outlet ring.

5. Assembly of claim 4:

wherein the planar dimension on the rupture disk face surrounded by the outlet ring is greater than the planar dimension on the rupture disk face surrounded by the inlet ring.

6. Assembly of claim 4:

wherein the inlet and outlet rings are integral with the rupture disk.

7. Assembly of claim 1:

wherein the retaining means is defined as restraining motion of the vacuum support member in all directions except through the blow-out portion of the rupture disk.

8. Assembly of claim 1:

wherein the blow-out portion of the rupture disk and the vacuum support member are circular in the planar dimension.

9. Assembly of claim 1:

wherein the vacuum support member is frangible.

10. Assembly of claim 9 in which the vacuum support member comprises:

a plurality of segments.

11. Assembly of claim 10:

wherein the segments are wedge-shaped in the planar dimension.

12. Assembly of claim 10:

wherein the segments are not annular in shape.

13. Vacuum support and rupture disk assembly in which the vacuum support member does not restrict flow through the rupture disk and in which the entire vacuum support member is discharged from the rupture disk assembly when the rupture disk ruptures, comprising:

a rupture disk having an inlet face and an outlet face defining a plane and including a blow-out portion of selected planar area and dimension;

an inlet ring disposed adjacent the inlet face of the rupture disk and having an inlet bore, the inlet bore defining the planar dimension of the blow-out portion on the inlet face;

a vacuum support member disposed adjacent the inlet face of the rupture disk and within the inlet bore between the rupture disk and an inlet pressure source, the vacuum support member being smaller in planar dimension than the inlet bore, the vacuum support member being smaller in planar area than the inlet face of the rupture disk so that the inlet face of the rupture disk is exposed to the full pressure of the inlet pressure source; and a retainer extending between the inlet ring and the vacuum support member for holding the vacuum support member adjacent the rupture disk and within the inlet bore when the rupture disk is unruptured, the vacuum support member being otherwise unrestrained against motion out of the inlet bore and through the blow-out portion of the ruptured rupture disk.

14. Assembly of claim 13:

wherein the vacuum support member is defined as substantially preventing flexure of the rupture disk toward the inlet ring.

15. Assembly of claim 13:

wherein the inlet ring is defined as being integral with the rupture disk.

16. Assembly of claim 13:

wherein the inlet bore is cylindrical in shape, the cylindrical shape having an axis about perpendicular to the plane of the rupture disk.

17. Assembly of claim 13, comprising:

an outlet ring disposed adjacent the outlet face of the rupture disk and having an outlet bore, the outlet bore defining the planar area and dimension of the blow-out portion on the outlet face of the rupture disk.

18. Assembly of claim 17:

wherein the outlet bore is equal to the inlet bore in planar dimension.

19. Assembly of claim 17:

wherein the outlet bore is larger than the inlet bore in planar dimension.

20. Assembly of claim 17:

wherein the outlet ring is defined as being integral with the rupture disk.

21. Assembly of claim 17:

wherein the outlet bore is cylindrical in shape, the cylindrical shape having an axis about perpendicular to the plane of the rupture disk.

22. Vacuum support and rupture disk assembly in which the vacuum support member does not restrict flow through the rupture disk, comprising:

a rupture disk having an inlet face and an outlet face defining a plane, the inlet face having an inlet bore of selected planar dimension, the inlet bore defining a blow-out portion of selected planar dimension on the inlet face;

a vacuum support member positionable in the inlet bore adjacent the inlet face of the rupture disk and between the rupture disk and an inlet pressure source, the vacuum support member being smaller in planar dimension than the blow-out portion and the inlet bore, the vacuum support member being smaller in planar area than the inlet face of the rupture disk so that the inlet face of the rupture disk is exposed to the full pressure of the inlet pressure source; and retaining means for holding the vacuum support member adjacent the inlet face of the rupture disk and restraining motion of the vacuum support member in all directions except through the rupture disk in such a manner that the entire vacuum support member will pass through the blow-out portion if the rupture disk ruptures.

\* \* \* \* \*